United States Patent [19]

Hert et al.

[11] Patent Number: 5,637,407
[45] Date of Patent: Jun. 10, 1997

[54] BLENDS OF THERMOPLASTIC AND RUBBER WHICH ARE ADHERENT TO THERMOPLASTICS

[75] Inventors: Marius Hert, Serquigny; Patrick Alex, Limours Pecquese; Martine Cerf; Christian Dousson, both of Bernay, all of France

[73] Assignee: Elf Atochem S. A., Paris-la-Defense, France

[21] Appl. No.: 337,922

[22] Filed: Nov. 10, 1994

[30]   Foreign Application Priority Data

Nov. 26, 1993 [FR]   France .................................. 93 14154

[51] Int. Cl.[6] ...................................................... B32B 27/08
[52] U.S. Cl. ........................... 428/474.7; 36/14; 428/480; 428/522; 525/66; 525/92 A; 525/167; 525/183
[58] Field of Search .............................. 428/474.7, 480, 428/522; 525/66, 92 A, 167, 183; 36/14

[56]   References Cited

U.S. PATENT DOCUMENTS

| 4,866,127 | 9/1989 | Jacquemin | 525/167 |
| 4,952,629 | 8/1990 | Liang | 525/92 A |
| 5,075,380 | 12/1991 | Lindner et al. | 525/183 |
| 5,149,589 | 9/1992 | Naritomi et al. | 428/412 |
| 5,169,894 | 12/1992 | Uehara | 525/167 |
| 5,252,665 | 10/1993 | Chiolle | 525/92 A |
| 5,272,206 | 12/1993 | Moffett | 525/167 |
| 5,371,143 | 12/1994 | Novak | 525/167 |
| 5,444,120 | 8/1995 | Liedloff | 525/167 |

FOREIGN PATENT DOCUMENTS

| 0472512A2 | 2/1992 | European Pat. Off. . |
| 0474927A1 | 3/1992 | European Pat. Off. . |

OTHER PUBLICATIONS

Derwent WPI Abstract of JP 63081158, Japan Synthetic Rubber Co. Ltd., WPI Acc. No. 88-138018/20.

*Primary Examiner*—Patricia A. Short
*Attorney, Agent, or Firm*—Pennie & Edmonds

[57]   ABSTRACT

Composite including a rubber/thermoplastic blend adherent by itself to a thermoplastic material; the blend is in the form of a thermoplastic matrix containing rubber nodules functionalized and vulcanized during the mixing with the thermoplastic. Composite articles obtained by overmoulding the vulcanized rubber/thermoplastic blend onto the thermoplastic.

5 Claims, No Drawings

BLENDS OF THERMOPLASTIC AND RUBBER WHICH ARE ADHERENT TO THERMOPLASTICS

FIELD OF THE INVENTION

The invention relates to composite articles including thermoplastic materials which are adherent by themselves to a particular class of thermoplastic elastomers which can be obtained by a process of dynamic vulcanization of rubbers dispersed in the form of fine particles in a thermoplastic matrix (called TPV in what follows); that is to say that the articles of the invention include a thermoplastic and a TPV, these TPVs being also called rubber/thermoplastic blends.

BACKGROUND OF THE INVENTION

The development of technical components fulfilling a number of functions increasingly requires the assembly of materials covering the widest possible spectrum of mechanical and physicochemical properties. The present invention relates to composites assembled without resort to adhesives, by using well-known fabricating processes such as overmoulding, two-material injection moulding and coextrusion.

European Application EP 550346 describes a process for obtaining, and articles consisting of, vulcanized rubbers and of polymers containing polyamide blocks which are used in combination without adhesives. It thus becomes possible to combine in the same object the specific properties of rubbers (small residual deformation on compression, low hardness, resistance to abrasion, to hot oils etc.) and the specific properties of polyetheresteramides (flexibility, good mechanical properties, fatigue resistance etc.).

However, the processes employed for producing these objects are partly those of the rubber industry, characterized by long cycle times (typically 10 minutes) and high processing costs.

The objective of the present invention is to obtain composite articles which have the same multiple functions by replacing the part consisting of vulcanized rubber with a thermoplastic rubber (TPV) and by resorting to thermoplastic fabrication processes. It is well known that TPVs are materials which have properties very closely related to vulcanized rubbers while retaining the easy processability of thermoplastics (see the review paper describing these materials by A. Coran et al. in "Thermoplastic Elastomers", MacMillan Publishing 1987).

Patent EP 231674 describes blends consisting of copolymers containing polyamide blocks and nonfunctionalized nitrile rubbers.

Japanese Application JP 63-81158 describes compositions based on polyetheresteramides and on various rubbers which are at least partially crosslinked, the two components being in a ratio of 1:1.

However, in the present invention the advantage of the vulcanization of the rubber lies in the possibility of creating a thermoplastic matrix even if the predominant component is the rubber. The advantage is also that of having a TPV formed by a thermoplastic matrix in which the vulcanized rubber is dispersed. This is valid even if the thermoplastic is in a minority and the rubber in a majority.

In the examples provided by the Japanese Applicant there is only a partial vulcanization of the rubber, whereas an advanced vulcanization (from 50 to 90%) makes it possible to obtain improved properties such as tensile strength, abrasion resistance, better tenacity and residual deformation on compression.

SUMMARY OF THE INVENTION

The present invention provides a composite material that comprises a thermoplastic material and a thermoplastic rubber blend which is capable of adhering to said thermoplastic material, wherein said thermoplastic rubber blend comprises (i) at least one functionalized and vulcanizable elastomer and (ii) at least one block copolymer comprising polyether or amorphous polyester blocks.

This composite material is used to make a composition of matter comprising a block copolymer containing polyether or amorphous polyester blocks as a matrix and further comprising nodules of functionalized and vulcanized rubber distributed throughout said composition of matter within said matrix. The composition of matter may be prepared by a process which comprises mixing (i) a formulation comprising at least one functionalized and vulcanizable elastomer, a vulcanizing agent, and, optionally, fillers and plasticizers and (ii) at least one block copolymer comprising polyether or amorphous polyester blocks, the mixing intimately dispersing elastomer (i) in molten block copolymer (ii) and being carried out at a temperature sufficient both to melt said block copolymer and to vulcanize said elastomer, said mixing being carried out for a period of time substantially less than that which would result in reaction of all of the functional groups in said functionalized elastomer.

The present invention further provides a method for the manufacture of the composite material which comprises combining the thermoplastic rubber blend and the thermoplastic material by a process selected from the group consisting of coinjection, overmolding, and coextrusion.

The endproducts of the present invention are articles of manufacture comprising thermoplastic materials and thermoplastic rubber blends capable of adhering to the thermoplastic material, wherein the thermoplastic rubber blends comprise (i) at least one functionalized and vulcanizable elastomer and (ii) at least one block copolymer comprising polyether or amorphous polyester blocks. The articles of manufacture may be configured as footware soles, coextruded sections, coextruded pipe in which the thermoplastic material and thermoplastic rubber blend is overmolded around pipe that has an outer layer made of polyamide, conveyor belts, and transmission belts.

DESCRIPTION OF THE PREFERRED EMBODIMENTS

The TPVs employed for producing the composite articles of the invention include:
- at least one functionalized and vulcanizable elastomer;
- at least one block copolymer containing polyether or amorphous polyester blocks.

It has been found that these TPV compositions can be used in combination with various thermoplastics using processes such as coinjection, overmoulding or coextrusion, that is to say essentially without adhesive.

The cohesion at the interface between these two materials is generally higher than the tensile strength of each of the 2 materials. However, it would not constitute a departure from the scope of the invention to add an adhesive onto all or part of the surface of contact.

The quantity of vulcanisable elastomer may be from 20 to 90% by weight of the TPV, that is to say of the vulcanizable elastomer block copolymer combination.

With regard to the block copolymer forming the TPV, its polyether or amorphous polyester blocks form its flexible part and polyamide, polyester or polyurethane semicrystalline blocks can form its rigid part.

By way of example there may be mentioned polyetherurethanes formed by the reaction of amorphous polyesterdiols with polyisocyanates, and polyetherurethanes formed by the reaction of polyetherdiols with polyisocyanates.

The block copolymer may include polyether units and polyester units. These are, for example, polyether blocks and polyester blocks. These products are known under the name of elastomeric polyesters and are thermoplastic.

The polyethers are, for example, polyethylene glycol (PEG), polypropylene glycol (PPG) or polytetramethylene glycol (PTMG).

The molecular mass $\overline{M}n$ of these polyethers may be between 250 and 6,000.

These polyethers condense with at least one dicarboxylic acid to form the flexible blocks of the elastomeric esters.

The polyester blocks result, for example, from the condensation of at least one diol with at least dicarboxylic acid. The diol may be glycol, propanediol or butanediol. The diacid may be terepthalic acid. These blocks form the rigid blocks of the elastomeric polyester.

The rigid blocks may include a number of units resulting from the action of the polyether on a diacid. The rigid blocks and the flexible blocks are connected by ester bonds. Such elastomeric polyesters are described in Patents EP 402 883 and EP 405 227.

As for the block copolymers which include polyether units and amide units, these may be distributed in a statistical or ordered manner. The amide units may be isolated or grouped in oligomers originating from the reaction of a diamine with a diacid or from the condensation of an alpha,omega-amino carboxylic acid.

The most widely employed elastomers are those including polyamide blocks and polyether blocks. The polyamide blocks may originate either from the condensation of a lactam or of an alpha,omega-amino acid, or from the reaction of a diacid and a diamine.

These polyamide blocks may be prepared in the presence of a diacid. Polyamide blocks with carboxylic acid ends are obtained. The molecular mass $\overline{M}n$ of the polyamide blocks may be between 600 and 5,000.

The polyethers are, for example, polyethylene glycol, polypropylene glycol or polytetramethylene glycol of molecular mass in between 250 and 6,000; a number of polyethers may be linked sequentially, for example using diacids in the case of polyetherdiols. The condensation of these polyamide blocks and of these polyetherdiol blocks produces polyetheresteramides.

It would not constitute a departure from the scope of the invention to employ other elastomers containing polyamide blocks and polyether blocks. These products can be prepared by reaction of lactam or alpha,omega-amino acid, of diacid and of polyetherdiol or polyetherdiamine. It is also possible to condense polyamide blocks containing amine ends with diacidic polyethers and to condense polyamide blocks containing acidic ends with polyetherdiamines (the latter are called polyetheramides).

All these products are described in U.S. Pat. Nos. 4,331,786, 4,115,475, 4,195,015, 4,839,441 and 4,864,014.

The elastomer present in the TPV is crosslinked, during the blending, by a vulcanizing system chosen from peroxides, sulphur and its accelerators and sulphur-donor molecules.

The vulcanizable synthetic or natural elastomers which are suitable for producing the TPV blends of the present invention are well known to a person skilled in the art, the term elastomer in the definition of the present invention meaning that it may consist of mixtures of a number of elastomers.

These elastomers or mixtures of elastomers have a residual deformation on compression (RDC) at 100° C. which is lower than 50%, generally between 5 and 40% and preferably lower than 30% after vulcanization.

The elastomer is functionalized, for example by carboxylic acid radicals, anhydrides, salts or esters of the said carboxylic acids, by epoxy or amino groups or by halogens.

The invention also relates to a process for manufacture of the TPV, in which is performed mixing:
of the vulcanizable functionalized elastomer which has been formulated beforehand with a sufficient quantity of vulcanizing agent and optionally of fillers and plasticizers;
of the block copolymer;
at a temperature which is sufficient to cause the melting of the block copolymer and the vulcanization, but with a scorching time which is sufficiently long to prevent using up all the functions in the elastomer before having intimately dispersed the elastomer in the molten block copolymer.

Byway of example of elastomer it is possible to mention natural rubber, polyisoprene, a polymerized emulsion based on styrene/butadiene copolymer, a polymerized solution based on styrene/butadiene copolymer, a polybutadiene which has a high content of double bond in a cis position, obtained by catalysis with nickel, cobalt, titanium or neodymium, a halogenated ethylene/propylene/diene terpolymer, a halogenated butyl rubber, a styrene/butadiene block copolymer, a styrene/isoprene block copolymer, the halogenated products of the above polymers, an acrylonitrile/butadiane copolymer, a hydrogenated acrylonitrile/butadiane copolymer, an acrylic elastomer, a fluoroelastomer, chloroprene and epichlorohydrine rubbers.

The above elastomers which are not functionalized may be functionalized, for example, by grafting radicals in a known manner or by mixing with already functionalized elastomers such as acrylic elastomers or carboxylated NBRs (X-NBR).

Among the abovementioned elastomers those advantageously chosen will be those included in the following group: carboxylated nitrile elastomers, acrylic elastomers, carboxylated polybutadienes, grafted ethylene/polypropylene/diene terpolymers or mixtures of these polymers with the same but ungrafted elastomers, such as nitrile rubbers, polybutadienes, ethylene/propylene/diene terpolymers, by themselves or mixed.

The abovementioned elastomers may also be mixed with rubber which is devoid of functions, the functionalized elastomer providing the compatibility between the latter and the block copolymer.

Rubber which is already vulcanized may also be added (recycling of ground material).

The abovementioned vulcanizable elastomers preferably include a weight content of functions of between 0.3 and 10% relative to the said elastomers.

The vulcanizing systems employed for producing these TPVs are well known to a person skilled in the art and, consequently, the invention is not restricted to systems of a particular type. It suffices that the latter should meet the criteria relating to the vulcanization kinetics defined in the definition of the invention indicated above.

When the elastomer is based on unsaturated monomer (butadiene, isoprene, vinylidenenorbornene etc.), four types of vulcanizing systems may be mentioned:
Sulphur systems consisting of sulphur used in combination with the usual accelerators, such as the metal salts of dithiocarbamates (zinc, tellurium and other dimethyl dithiocarbamates), thiuram disulphides (tetramethyl thiuram disulphide, and the like), sulphuramides, and the like.

These systems may also contain zinc oxide used in combination with stearic acid.

- Sulphur-donor systems in which most of the sulphur employed for the bridges originates from sulphur-containing molecules such as the organosulphur compounds referred to above.
- Systems containing phenolic resins, consisting of difunctional phenol-formaldehyde resins which may be halogenated, used in combination with accelerators such as stannous chloride or zinc oxide.
- Peroxide systems. These make it possible to have a product which is more stable to heat, and white, not yellow, as in the case of sulphur-donor systems. Any free-radical-donating systems can be employed (dicumyl and other peroxides) in combination with zinc oxide and stearic acid.

When the elastomer is acrylic (polybutyl acrylate with acidic or epoxy functional groups or any other reactive functional group permitting crosslinking), the usual crosslinking agents are employed, based on diamines (ortho-toluidylguanidine, diphenylguanidine, and the like) or blocked diamines (hexamethylenediamine carbamate and the like).

The elastomeric compositions may be modified for certain particular properties (for example improvement in the mechanical properties) by the addition of fillers such as carbon black, silica, kaolin, clay, talc, chalk and the like. Calcined kaolin may be preferable to silica to avoid the partial hydrolysis of the thermoplastic in the molten state during the blending with rubber. These fillers may be surface-treated with silanes, polyethylene glycols or any other coupling molecule. In general the filler content in parts by weight is between 5 and 100 per 100 parts of elastomers.

In addition, compositions may be softened with plasticizers such as mineral oils derived from petroleum, phthalic acid or sebacic acid esters, liquid polymeric plasticizers such as optionally carboxylated polybutadiene of low molecular mass, and other plasticisizers which are well known to a person skilled in the art.

The combinations of vulcanizing agent employed for implementing the process are such that they must permit a complete crosslinking of the elastomer in accordance with kinetics resulting in good properties of resistance to separation, as mentioned in the definition of the invention and, in general, in good rubber properties (measured by a residual deformation on compression at 100° C., tensile properties and the like).

Advantageously, the kinetics measured With the aid of an oscillating rheometer, will be such that the characteristic time for 90% vulcanization, $t_{90}$, does not exceed 15 minutes at 160° C. and advantageously will be between 5 and 10 minutes.

In the case of a carboxylated unsaturated elastomer, since the vulcanization of the rubber phase dispersed in the thermoplastic matrix takes place by virtue of the double bonds and of the carboxylic groups, it is necessary to prevent the latter, which are more reactive, being completely used up for the crosslinking while they are still necessary for producing compatibility with the thermoplastic. This is why it is necessary to control the vulcanization temperature properly to have a sufficiently long scorching time and thus to allow the carboxylic groups which are still free time to react with the thermoplastic in a melt phase.

The present invention also relates to a thermoplastic matrix containing nodules of functionalized rubber, the thermoplastic being chosen from those defined above in the case of the TPVs.

The TPVs described above may be used in combination with thermoplastic materials chosen, for example, from polyamides, thermoplastic elastomers containing polyamide blocks, thermoplastic elastomers containing polyester blocks, semicrystalline polyesters, polyurethanes (TPU) and rigid or plasticized PVCs. Processes which are known to a person skilled in the art are employed, such as overmoulding, coinjection, coextrusion, lamination and the like.

Among the typical examples of combined use we can mention:

Footwear articles using overmoulding or coinjection.

Soles made of polyetheresteramide chosen because of its high fatigue resistance, its low deformation hysteresis and its good cold properties, onto which a TPV blend is injection-overmoulded to create a wear layer or crampons which resist abrasion, skidding, oils and greases.

Coextruded sections

Some of these TPVs can be employed in combination with plasticized PVC to form the part of the section subjected to compression, requiring a good creep resistance when heated, a high flexibility, applications such as seals in building and motor vehicles.

Coextruded pipes

These TPVs can be extruded into flexible pipes which have a good resistance to oils when heated. Using coextrusion, they can coat a pipe which has an outer layer which is one of the abovementioned thermoplastic materials, for example polyamide.

Conveyor belts

Among the various multilayer structures of the prior art there are some in which the outer layers consist of rubber adhesively bonded to the surface of copolyetheresteramides, TPVs or copolyethers containing polyester blocks or TPUs. These adhesively bonded rubber layers may be advantageously replaced with these TPVs coextruded with one or more of the abovementioned thermoplastic materials.

The TPV contributes the abrasion resistance, the high friction coefficient, the elasticity and the low hardness, while the thermoplastic contributes the flexural strength, fatigue resistance and tenacity.

Transmission belts

Some belts require very flexible materials in order to enclose completely pulleys of small diameter rotating at high speed. The face in contact with the pulley must have a good rubbery elasticity and a high friction coefficient.

EXAMPLES

Examples 1, 2, 3 and 4 relating to the production and the characterization of the TPVs employed in Examples 5–7 for giving rise to composite articles.

Example 1 a) A carboxylated nitrile elastomer (XNBR) of Chemigum trademark (Goodyear RTM) was formulated on an internal mixer at temperatures not exceeding 120° C., in the following manner (parts by weight):

| | | |
|---|---|---|
| Carboxylated butadiene acrylonitrile | CNBR RCG 7343 | 110 |
| | Silica KG 300 | 20 |
| Diisononyl phthalate | DINP | 5 |
| Polyethylene glycol | PEG 4000 | 2 |
| | $TiO_2$ | 5 |
| Vinylsilane (trimethoxy) | SI 69 | 1 |
| Antioxidant | Wingstay 29 | 1 |

-continued

| Activator | Polyvest C70 | 4 |
| | Sulphur | 1.8 |
| | ZnO | 5 |
| | Stearic acid | 1 |
| Benzothiazyl disulphide | MBTS | 1.5 |
| Tetramethylthiuram disulphide | TMTD | 0.5 |

This elastomeric composition was then blended on an internal mixer with a polyetheresteramide of trademark Pebax 4033 of shore D hardness 40, consisting of polytetramethylene glycol blocks and of PA 12 blocks, with the following composition:

| Elastomers | 60% |
| Pebax 4033 | 40% |

The temperature at the end of mixing was 220° C.

This TPV was granulated in an extruder and then injection-moulded on a thermoplastic press into various test-piece moulds.

The tests for properties measured according to the standards shown are given in Table 1.

b) Similar results were obtained with the product Chemigum NX 775 (Goodyear RTM, containing 7% of carboxylic groups), which was preground.

Example 2

The elastomeric composition of Example 1 was mixed, on an internal mixer, with a polyester block polyether of trademark Hytrel 4056 (PBT blocks and terephthalate PTMG blocks), of composition:

| Elastomer | 60% |
| Hytrel | 40% |

The temperature at the end of mixing was 210° C.

The properties of this blend are given in Table 1.

Example 3

The elastomeric composition of Example 1 was mixed, on an internal mixer, with a polyurethane containing polyester blocks of trademark Desmopan 590, of composition:

| Elastomer | 60% |
| Desmopan | 40% |

The temperature at the end of mixing was 230° C.
The properties of this blend are given in Table 1.

Example 4

A mixture of elastomers, fillers, plasticizers and vulcanizing system was produced on an internal mixer at temperatures not exceeding 120° C. The composition of this mixture is the following:

| Butadiene-nitrile elastomer Chemigum | P90 | 70 |
| Carboxylated butadiene- | Chemigum RCG 7343 | 30 |

-continued

| nitrile elastomer | | |
| Silica | KS 300 | 10 |
| Isononyl phthalate | DINP | 20 |
| Zn oxide | ZnO | 5 |
| Titanium oxide | TiO$_2$ | 5 |
| Silane | SI 69 | 2 |
| Wax | PEG 4000 | 2 |
| | Stearic acid | 0.5 |
| | Trigonox B peroxide | 2 |
| | Zinc acrylate | 2 |

This elastomeric composition was mixed on an internal mixer with a polyetheresteramide of trademark Pebax 5533 consisting of PA 12 and PTMG blocks and of shore D hardness=55, of the following composition:

| Elastomer | 70% |
| Pebax 5533 | 30% |

The temperature at the end of mixing was 210° C.
The properties of this blend are given in Table 1.

Example 5

An injection-moulding press for thermoplastics, of trademark Kraus Maffei and with a clamping force of 110 t (1100 kN) is equipped with a mould 100×100×5 mm in size.

Various polyetheresteramide and PA 12 plaques, 100× 100×2 mm in size, were produced beforehand by injection moulding. These plaques are positioned as an insert in the mould of 5 mm thickness. The overmoulding was carried out with the TPV thermoplastic rubber of Example 1 on various series of plaques referred to as:

5.1: polyetheresteramide plaques of trademark Pebax 4033

5.2: polyetheresteramide plaques of trademark Pebax 5533

5.3: polyetheresteramide plaques of trademark Pebax 6333 ditto with Pebax 4033 except for the shore D hardness=63

5.4: polamide 12 plaques of trademark Rilsan AESNO

The injection stock temperature is 260° C. and the mould temperature 40° C. In the case of Example 5.4 the injection temperature is 290° C.

The peel strength between the two materials, measured at a speed of 50 mm/min is given in the following table:

| EXAMPLE | 5.1 | 5.2 | 5.3 | 5.4 |
|---|---|---|---|---|
| Peel strength daN/cm | 5.6 | 7.5 | 7.6 | 7.0 |

In all cases the break was cohesive in nature in the thermoplastic rubber.

Example 6

Plaques of polyether containing polyester blocks, of trademark Hytrel 4056 were overmoulded with the TPV of Example 2 in the conditions described in Example 5.

The peel strength between the two materials is 6.2 daN/cm.

Example 7

Plaques of polyurethane of trademark Desmopan were overmoulded with the TPV of Example 3 in the conditions described in Example 5. The peel strength between the two materials is 5.2 daN/cm and the break is cohesive in the TPV.

TABLE 1

EXAMPLES

| Properties | Method | Units | 1 | 2 | 3 | 4 |
| --- | --- | --- | --- | --- | --- | --- |
| Hardness | ASTM D2240 | Shore A | 82 | 79 | 77 | 85 |
|  |  | Shore D | 27 | 25 | 25 | 30 |
| Tensile s. | ASTM D412 | MPa | 14.9 | 14.5 | 13.1 | — |
| Break elong.* | ASTM D412 | % | 377 | 520 | 320 | — |
| 100% modulus | ASTM D412 | MPa | 6.2 | 4.5 | 5.4 | — |
| 200% | ASTM D412 |  | 8.8 | 6.5 | 8.6 | — |
| 300% | ASTM D412 |  | 11.5 | 8.7 | 12.7 | — |
| Unnotched tearing | ASTM D624 | KN/m | 54 | 56.8 | 39.1 | — |
| RDC** 22 h at 100° C. | ASTM D395 | % | 59 | 56 | 46.5 | 48 |
| Abrasion | DIN 53516 | mg/mm$^3$ | 93.4 |  |  | 100 |
| Swelling ASTM oil No. 3 | ASTM D471 | % vol | 16 | — | — | 2.6 |

*Elongation at break
**RDC: residual deformation on compression
—: not measured

We claim:

1. A composite comprising
   (A) a thermoplastic material layer and
   (B) a thermoplastic rubber blend layer which is capable of adhering to said thermoplastic material layer,
      wherein the thermoplastic rubber blend layer comprises (i) at least one vulcanizable carboxylated nitrile elastomer and (ii) at least one block copolymer comprising polyether or amorphous polyester blocks.

2. An article of manufacture comprising
   (A) a thermoplastic material layer and
   (B) a thermoplastic rubber blend layer which is capable of adhering to said thermoplastic material layer,
      wherein said thermoplastic rubber blend comprises (i) at least one functionalized and vulcanizable elastomer wherein said at least one vulcanizable elastomer is a carboxylated nitrile elastomer and (ii) at least one block copolymer comprising polyether or amorphous polyester blocks.

3. A composite comprising
   (A) a thermoplastic material layer and
   (B) a thermoplastic rubber blend layer which is capable of adhering to said thermoplastic material layer,
      wherein said thermoplastic rubber blend layer comprises (i) at least one functionalized and vulcanizable elastomer and (ii) at least one block copolymer comprising polyether or amorphous polyester blocks;
      wherein block copolymer (ii) comprises a rigid portion formed of polyamide, polyester, or polyurethane blocks and a flexible part formed of polyether or amorphous polyester blocks;
      wherein said thermoplastic material layer (A) is a polyetheresteramide and said thermoplastic rubber blend layer (B) comprises (i) a carboxylated nitrile elastomer and (ii) a polyetheresteramide.

4. The composite of claim 3 wherein block copolymer (ii) comprises a rigid portion formed of polyamide blocks and a flexible part formed of polyether blocks.

5. An article of manufacture comprising
   (A) a thermoplastic material layer and
   (B) a thermoplastic rubber blend layer which is capable of adhering to said thermoplastic material layer,
      wherein said thermoplastic rubber blend comprises (i) at least one functionalized and vulcanizable elastomer and (ii) at least one block copolymer comprising polyether or amorphous polyester blocks, configured as a footware sole.

* * * * *